(12) United States Patent
Lim et al.

(10) Patent No.: US 12,283,118 B2
(45) Date of Patent: Apr. 22, 2025

(54) DEVICE AND METHOD FOR DETECTING 3D OBJECT

(71) Applicants: Hyundai Motor Company, Seoul (KR); Kia Corporation, Seoul (KR)

(72) Inventors: Hyun Kyu Lim, Seoul (KR); Young Hyun Kim, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 509 days.

(21) Appl. No.: 17/699,601

(22) Filed: Mar. 21, 2022

(65) Prior Publication Data

US 2023/0131284 A1 Apr. 27, 2023

(30) Foreign Application Priority Data

Oct. 27, 2021 (KR) .................. 10-2021-0144886

(51) Int. Cl.
*G06V 20/64* (2022.01)
*G06T 7/70* (2017.01)

(52) U.S. Cl.
CPC ............... *G06V 20/64* (2022.01); *G06T 7/70* (2017.01)

(58) Field of Classification Search
None
See application file for complete search history.

(56) References Cited

U.S. PATENT DOCUMENTS

| | | |
|---|---|---|
| 11,080,878 B2 | 8/2021 | Choi et al. |
| 2020/0143557 A1* | 5/2020 | Choi .................. G06T 7/70 |
| 2021/0110202 A1 | 4/2021 | Vu et al. |
| 2021/0209341 A1 | 7/2021 | Ye et al. |
| 2022/0292296 A1* | 9/2022 | Hieida ............... G06N 3/04 |

FOREIGN PATENT DOCUMENTS

KR 10-2020-0050246 A 5/2020

OTHER PUBLICATIONS

P. Li and H. Zhao, "Monocular 3D Detection With Geometric Constraint Embedding and Semi-Supervised Training," in IEEE Robotics and Automation Letters, vol. 6, No. 3, pp. 5565-5572, Jul. 2021, doi: 10.1109/LRA.2021.3061343.
G. Brazil and X. Liu, "M3D-RPN: Monocular 3D Region Proposal Network for Object Detection," 2019 IEEE/CVF International Conference on Computer Vision (ICCV), 2019, pp. 9286-9295, doi: 10.1109/ICCV.2019.00938.

\* cited by examiner

*Primary Examiner* — Andrew H Lam
(74) *Attorney, Agent, or Firm* — Morgan, Lewis & Bockius LLP

(57) ABSTRACT

An apparatus and a method for detecting a three-dimensional object includes a camera configured for obtaining a 2D image, and a controller electrically connected to the camera, and the controller extracts 2D information and 3D information for at least one object from the 2D image, and detects 3D object information by utilizing the 2D information and the 3D information.

11 Claims, 6 Drawing Sheets

DEVICE AND METHOD FOR DETECTING 3D OBJECT

CROSS-REFERENCE TO RELATED APPLICATION

The present application claims priority to Korean Patent Application No. 10-2021-0144886, filed on Oct. 27, 2021, the entire contents of which is incorporated herein for all purposes by this reference.

BACKGROUND OF THE PRESENT DISCLOSURE

Field of the Present Disclosure

The present disclosure relates to a device and a method for detecting a three-dimensional object.

DESCRIPTION OF RELATED ART

Because there is no depth information in a monocular image, that is, a 2D image obtained by a monocular camera, it is difficult to detect 3D information using the monocular image. To solve such difficulties, conventionally, an anchor-based network and an anchorless network (e.g., a CenterNet) have been developed. Among them, a monocular 3D region proposal network (M3D-RPN), which is the anchor-based network, generates a virtual 2D or 3D anchor box and learns information difference between an object to be detected and the anchor box, so that a 2D output performance of the network is superior to a 3D output performance. However, a 2D learning result is not directly used to predict the 3D information. Furthermore, the more anchor boxes are placed on the image, the better in terms of performance, but there is a problem in increasing a network operation time.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a device and a method for detecting a three-dimensional object using a two-dimensional image captured by a monocular camera.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a device configured for detecting a three-dimensional object includes a camera configured for obtaining a 2D image, and a controller electrically connected to the camera, and the controller extracts 2D information and 3D information for at least one object from the 2D image, and detects 3D object information by utilizing the 2D information and the 3D information.

In an exemplary embodiment of the present disclosure, the 2D information may include 2D center coordinates, a width, and a height of a 2D anchor box, and the 3D information may include 3D center coordinates, a width, a height, a length, and a yaw of a 3D anchor box.

In an exemplary embodiment of the present disclosure, the controller may generate the 2D anchor box on the 2D image, and generate the 3D anchor box by averaging 3D information of objects fitted to the 2D anchor box.

In an exemplary embodiment of the present disclosure, the controller may learn a difference between the 2D anchor box, the 3D anchor box, and object information.

In an exemplary embodiment of the present disclosure, the controller may match the 2D information with the 3D information on the 2D image and determine 3D position information of an object matching the 3D information based on a result of the matching.

In an exemplary embodiment of the present disclosure, the controller may be configured to determine distances between corner points of the 2D anchor box and corner points of the 3D anchor box, and select two pairs of corner points with a shortest determined distance among the determined distances.

In an exemplary embodiment of the present disclosure, the controller may be configured to determine the 3D center coordinates of the 3D anchor box using the selected two pairs of corner points.

In an exemplary embodiment of the present disclosure, the controller may select the 3D information using argmax, and output the 3D object information by sequentially performing decode, softmax, sort, and non-maximum suppression (NMS) on the selected 3D information.

In an exemplary embodiment of the present disclosure, the controller may remove a corresponding 3D information when a result of scaling a possibility that the 3D information is a background with a predetermined ratio exceeds a possibility that the 3D information is an object.

In an exemplary embodiment of the present disclosure, the camera may be a monocular camera.

According to another aspect of the present disclosure, a method for detecting a three-dimensional object includes obtaining, by a controller, a 2D image using a camera, extracting, by the controller, 2D information and 3D information for at least one object from the 2D image, and detecting, by the controller, 3D object information by utilizing the 2D information and the 3D information.

In an exemplary embodiment of the present disclosure, the 2D information may include 2D center coordinates, a width, and a height of a 2D anchor box, and the 3D information may include 3D center coordinates, a width, a height, a length, and a yaw of a 3D anchor box.

In an exemplary embodiment of the present disclosure, the extracting of the 2D information and the 3D information may include creating, by the controller, the 2D anchor box on the 2D image, and creating, by the controller, the 3D anchor box by averaging 3D information of objects fitted to the 2D anchor box.

In an exemplary embodiment of the present disclosure, the extracting of the 2D information and the 3D information may further include learning, by the controller, a difference between the 2D anchor box, the 3D anchor box, and object information.

In an exemplary embodiment of the present disclosure, the detecting of the 3D object information may include matching, by the controller, the 2D information with the 3D information on the 2D image, and determining, by the controller, 3D position information of an object matching the 3D information based on a result of the matching.

In an exemplary embodiment of the present disclosure, the matching of the 2D information with the 3D information may include determining, by the controller, distances between corner points of the 2D anchor box and corner points of the 3D anchor box, and selecting, by the controller, two pairs of corner points with a shortest determined distance among the determined distances.

In an exemplary embodiment of the present disclosure, the determining of the 3D position information of the object may include determining, by the controller, the 3D center coordinates of the 3D anchor box using the selected two pairs of corner points.

In an exemplary embodiment of the present disclosure, the detecting of the 3D object information may include selecting, by the controller, the 3D information using argmax, and outputting, by the controller, the 3D object information by sequentially performing decode, softmax, sort, and non-maximum suppression (NMS) on the selected 3D information.

In an exemplary embodiment of the present disclosure, the selecting of the 3D information may include removing, by the controller, the corresponding 3D information when a result of scaling a possibility that the 3D information is a background with a predetermined ratio exceeds a possibility that the 3D information is an object.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
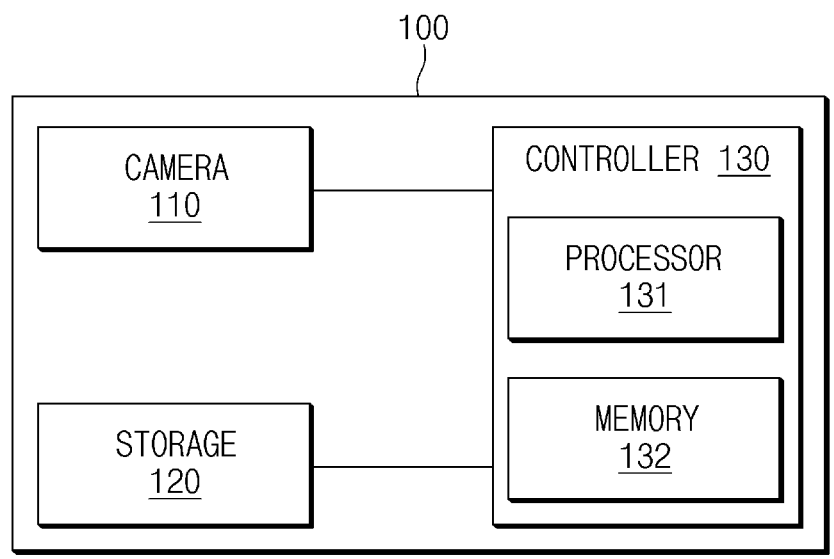
FIG. 1 is a block diagram illustrating a three-dimensional object detection device according to various exemplary embodiments of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to the exemplary drawings. In adding the reference numerals to the components of each drawing, it should be noted that the identical or equivalent component is designated by the identical numeral even when they are displayed on other drawings. Furthermore, in describing the exemplary embodiment of the present disclosure, a detailed description of the related known configuration or function will be omitted when it is determined that it interferes with the understanding of the exemplary embodiment of the present disclosure.

In describing the components of the exemplary embodiment according to an exemplary embodiment of the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which the present disclosure belongs. It will be further understood that terms, such as those defined in commonly used dictionaries, should be interpreted as having a meaning which is consistent with their meaning in the context of the relevant art and will not be interpreted in an idealized or overly formal sense unless expressly so defined herein.

In the present disclosure, a technology for predicting information related to a three-dimensional object using a result of learning (training) by utilizing a two-dimensional image during a process of obtaining autonomous driving cognitive learning data is presented.

Figure 2A:
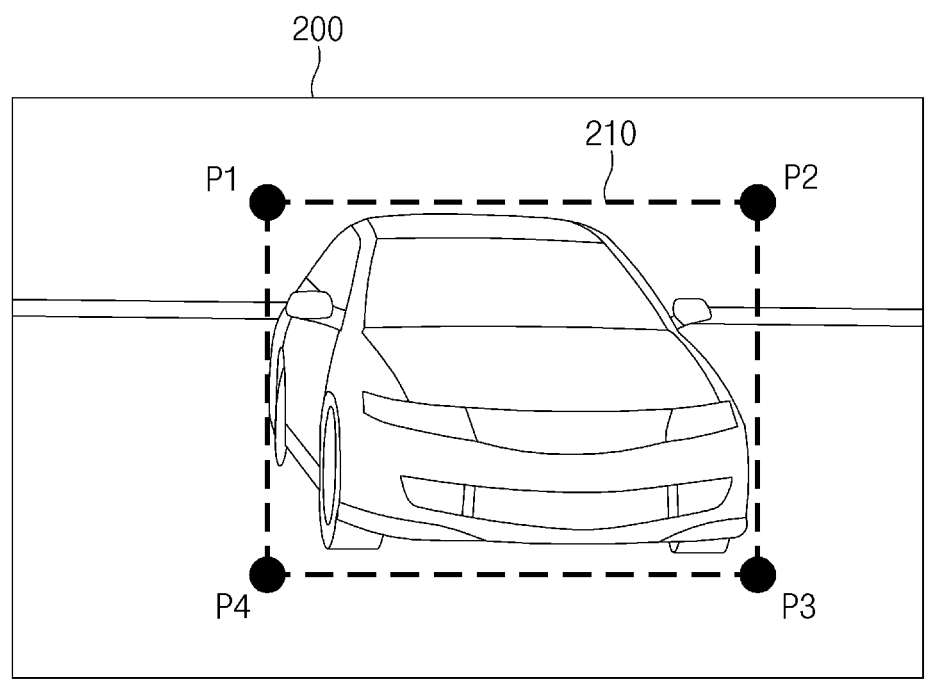
FIG. 2A is an exemplary diagram illustrating a two-dimensional anchor box according to various exemplary embodiments of the present disclosure.
Figure 2B:
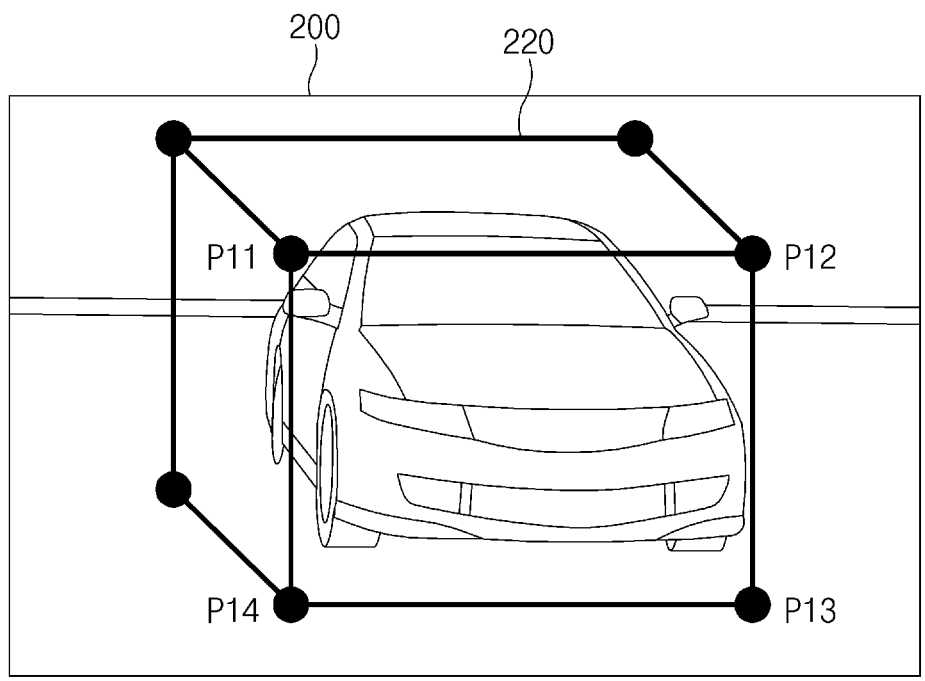
FIG. 2B is an exemplary diagram illustrating a three-dimensional anchor box according to various exemplary embodiments of the present disclosure.
Figure 3:
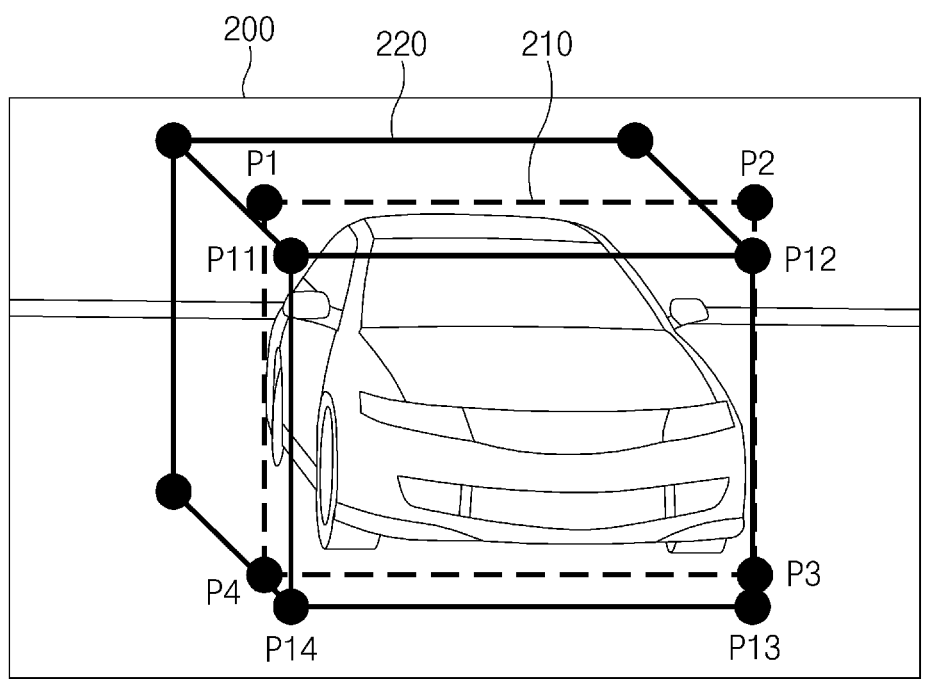
FIG. 3 is an exemplary diagram illustrating matching of a two-dimensional point and a three-dimensional point according to various exemplary embodiments of the present disclosure.

FIG. 1 is a block diagram illustrating a three-dimensional object detection device according to various exemplary embodiments of the present disclosure. FIG. 2A is an exemplary diagram illustrating a two-dimensional anchor box according to various exemplary embodiments of the present disclosure. FIG. 2B is an exemplary diagram illustrating a three-dimensional anchor box according to various exemplary embodiments of the present disclosure. FIG. 3 is an exemplary diagram illustrating matching of a two-dimensional point and a three-dimensional point according to various exemplary embodiments of the present disclosure.

A three-dimensional (3D) object detection device 100 may be mounted on a vehicle to detect 3D information (3D object information) about an object (e.g., a pedestrian, a vehicle, a bus, and/or a truck) around the vehicle.

Referring to FIG. 1, the 3D object detection device 100 may include a camera 110, storage 120, a controller 130, and the like.

The camera 110 may obtain a two-dimensional (2D) image. The camera 110 may be a monocular camera including one lens. The camera 110 may be provided at a point corresponding to a center portion of a vehicle width, and may be provided horizontally with the ground while facing a region ahead of and/or at the rear of the vehicle.

The storage 120 may store the 2D image(s) captured by the camera 110. In addition, the storage 120 may store an object extraction model. The object extraction model may be executed by a processor 131 to be described later. The storage 120 may include at least one of storage media such as a flash memory, a hard disk, a solid state disk (SSD), a secure digital card (SD card), an embedded multimedia card (eMMC), a universal flash storage (UFS), a removable disk, and/or a web storage.

The controller 130 may be electrically connected to the camera 110 and the storage 120. The controller 130 may include the processor 131 and a memory 132. The processor 131 may include at least one of processing devices such as an application specific integrated circuit (ASIC), a digital signal processor (DSP), a programmable logic device (PLD), a field programmable gate array (FPGA), a central processing unit (CPU), a microcontroller, and/or a microprocessor. The memory 132 may be a non-transitory storage medium that stores instructions executed by the processor 131. Although the memory 132 is illustrated as being located outside the processor 131, the memory 132 may not be limited thereto and may be located inside the processor 131. The memory 132 may include at least one of storage media such as a random access memory (RAM), a static random access memory (SRAM), a read only memory (ROM), a programmable read only memory (PROM), an electrically erasable and programmable ROM (EEPROM), and/or an erasable and programmable ROM (EPROM).

The processor 131 may obtain the 2D image through the camera 110. The processor 131 may train the object extraction model using the 2D image. The processor 131 may provide the 2D image, 2D verification information, and 3D verification information as input data (train data) to the object extraction model. The 2D verification information may include information such as 2D center coordinates (w, y), a width, a height, and the like of a 2D ground-truth bounding box for an object in the 2D image. The 3D verification information may include information such as 3D center coordinates (w, y, z), a width, a height, a length, a yaw, and the like of a 3D ground-truth bounding box for the object in the 2D image.

For the training of the object extraction model, the processor 131 may generate a 2D anchor box (a boundary box) and a 3D anchor box on the 2D image. A size and a type of the 2D anchor box may be defined in advance by a system developer. The 2D anchor box may be disposed at every pixel of the 2D image. For example, when placing 12 anchor boxes at 100 pixels, 1200 anchor boxes may be generated. Furthermore, to generate the 3D anchor box, the processor 131 may repeat, for all of the train data, a process of projecting 3D verification information (object information) of the training data to the 2D image, and a process of matching the most similar 2D anchor box and 3D verification information. The processor 131 may generate the 3D anchor box by averaging 3D information of objects matched to each 2D anchor box as shown in [Table 1].

TABLE 1

| 2D anchor box | Object 1 | Object 2 | ... Object n | Average (3D anchor box) |
|---|---|---|---|---|
| Type 1 (size 10 × 10) | Longitudinal direction: 100 | Longitudinal direction: 90 | ... ... | Longitudinal direction: 95 |
| | Lateral direction: 50 Width: 4 | Lateral direction: 30 Width: 5 | | Lateral direction: 45 Width: 4.5 |
| | ... | ... | | ... |
| Type 2 (size 20 × 10) | ... | ... | ... ... | ... |
| ... | ... | ... | ... ... | ... |

The processor 131 may allow the object extraction model to learn a difference between the generated 2D anchor box and 3D anchor box and a verification anchor box. In other words, the object extraction model may learn a difference between sizes of the generated 2D anchor box and 3D anchor box and the object information. The processor 131 may extract 2D information, 3D information, and a confidence for each object from the 2D image using the object extraction model. In other words, when receiving the 2D image, the object extraction model may extract and output the 2D information, the 3D information, and the confidence for at least one object in the corresponding 2D image. In the present connection, the 2D information may include information such as 2D center coordinates (w, y), a width, a height, and the like of the 2D anchor box. The 3D information may include information such as 3D center coordinates (w, y, z), a width, a height, a length, a yaw, and the like of the 3D anchor box. The confidence is a value indicating a probability that an object in each anchor box is of a specific class (e.g., a background, a vehicle, a truck, a bus, and the like).

The processor 131 may determine whether the confidence is less than a preset threshold. The threshold may be determined in advance by a system designer. When the confidence is less than the threshold, the processor 131 may perform image projection using the 3D information. In other words, the processor 131 may project corner points of the 3D anchor box onto the 2D image. In the present connection, the processor 131 may use a following [Equation 1] to convert a 3D point into a 2D point.

$$P_{2D} = K \times P_{3D} \quad \text{[Equation 1]}$$

Here, $P_{2D}$ is 2D point coordinates on the image, $P_{3D}$ is corner point coordinates of the 3D anchor box, and "K" is an intrinsic value determined by camera characteristics.

The processor 131 may determine distances between four corner points of the 2D anchor box and eight corner points of the 3D anchor box. The processor 131 may select two pairs of corner points (points) including the shortest distance among the determined distances.

For example, the processor 131 may determine distances between four corner points of a 2D anchor box 210 on a 2D image 200 shown in FIG. 2A and eight corner points of a 3D anchor box 220 shown in FIG. 2B. When the distance determination result is as in [Table 2] below, the processor 131 may select P1 of the 2D anchor box 210 and P11 of the 3D anchor box 220, and P3 of the 2D anchor box 210 and P13 of the 3D anchor box 220.

TABLE 2

| | P11 | P12 | P13 | P14 | ... |
|---|---|---|---|---|---|
| P1 | 1 | 4 | 3 | 5 | ... |
| P2 | 4 | 5 | 4 | 6 | ... |

TABLE 2-continued

|    | P11 | P12 | P13 | P14 | ... |
|----|-----|-----|-----|-----|-----|
| P3 | 7   | 5   | 1   | 23  | ... |
| P4 | 9   | 3   | 2   | 3   | ... |

As described above, because the point matching of the 2D anchor box and the 3D anchor box is performed based on the 3D anchor box, a rigid body shape is preserved and reliable 2D point matching is possible. The processor 131 may determine 3D position information (that is, the 3D center coordinates of the 3D anchor box) of an object in the 3D anchor box using the matched two pairs of points. The processor 131 may determine 3D position coordinates (x, y, z) of the object using a conventionally known 2D image-based 3D position determination formula (P. Li and H. Zhao, "Monocular 3D Detection With Geometric Constraint Embedding and Semi-Supervised Training," in IEEE Robotics and Automation Letters, vol. 6, no. 3, pp. 5565-5572 July 2021, doi: 10.1109/LRA.2021.3061343.).

The processor 131 may perform post-processing on the 3D information, that is, the 3D anchor boxes, extracted from the 2D image. In the post-processing, first, the processor 131 may select the extracted 3D anchor box based on a predetermined anchor box selection criterion (condition). In the present connection, the processor 131 may select the anchor box using argmax.

In an exemplary embodiment of the present disclosure, the processor 131 may select the 3D anchor box based on a classification value (a confidence) of the 3D anchor box. The processor 131 may delete (remove) the corresponding anchor box when a possibility of being the background and a possibility of being the object of the 3D anchor box satisfy a following condition.

$$C_{background} \times S > C_{object}$$ [Anchor Box Selection Condition]

Here, $C_{background}$ is the probability that the anchor box is classified as the background, and $C_{object}$ is the probability that the anchor box is classified as the object (e.g., the vehicle). Furthermore, S, which is a scaling ratio, may be determined in advance by an experiment or the like.

The processor 131 may detect final 3D object information by sequentially performing decode, softmax, sort, non-maximum suppression (NMS), and the like on the selected 3D anchor box. The processor 131 may detect 3D information of an object located within a predetermined radius from the camera 110 among the objects extracted from the 2D image through the post-processing.

According to the above embodiment, the present disclosure selects the anchor box using the argmax immediately after extracting the 3D anchor boxes of the objects from the 2D image, so that the number of anchors to be operated later may be reduced. Referring to [Table 3], conventional post-processing proceeded in an order of the softmax, the decode, the argmax, the sort, and the NMS, but in the present disclosure, after selecting the anchor box using the argmax, the decode, the softmax, the sort, and the NMS proceed in the order, so that an operation speed may be improved as the number of anchors operated during the post-processing is reduced.

TABLE 3

| Division | Conventional post-processing | | Post-processing of the present disclosure | |
|---|---|---|---|---|
| | Order | The number of anchors | Order | The number of anchors |
| 1 | Network | 1000 | Network | 1000 |
| 2 | Softmax | 1000 | Argmax | 100 |
| 3 | Decode | 1000 | Decode | 100 |
| 4 | Argmax | 100 | Softmax | 100 |
| 5 | Sort | 100 | Sort | 100 |
| 6 | Nms | 5 | Nms | 5 |

Figure 4:
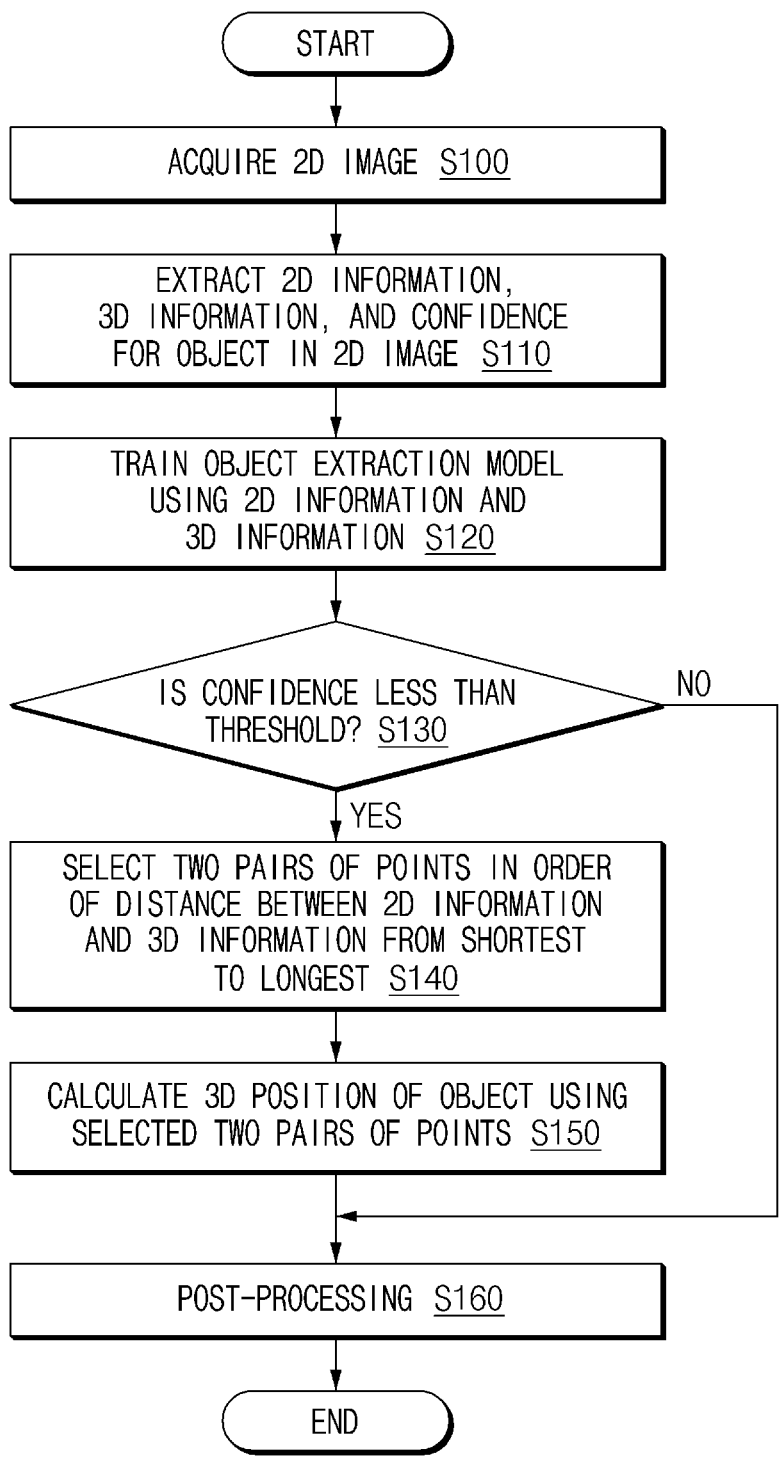
FIG. 4 is a flowchart illustrating a three-dimensional object detection method according to various exemplary embodiments of the present disclosure.

FIG. 4 is a flowchart illustrating a three-dimensional object detection method according to various exemplary embodiments of the present disclosure.

The controller 130 may obtain the 2D image using the camera 110 (S100). The camera 110 may be implemented as the monocular camera including one lens. The camera 110 may capture surroundings of the vehicle and transmit the captured 2D image to the controller 130. The controller 130 may receive the 2D image, the 2D verification information, and the 3D verification information as the train data. The 2D verification information may include the information such as the 2D center coordinates (w, y), the width, the height, and the like of the 2D ground-truth bounding box for the object in the 2D image. The 3D verification information may include the information such as the 3D center coordinates (w, y, z), the width, the height, the length, the yaw, and the like of the 3D ground-truth bounding box for the object in the 2D image.

The controller 130 may extract the 2D information, the 3D information, and the confidence for the at least one object in the 2D image (S110). The controller 130 may extract the 2D information, the 3D information, and the confidence for each object from the 2D image using the object extraction model. The 2D information may include the information such as the 2D center coordinates (w, y), the width, the height, and the like of the 2D anchor box. The 3D information may include the information such as the 3D center coordinates (w, y, z), the width, the height, the length, the yaw, and the like of the 3D anchor box. The confidence is the value indicating the probability that the object in each anchor box is of the specific class (e.g., the background, the vehicle, the truck, the bus, and the like). The controller 130 may generate the 2D anchor box and the 3D anchor box on the 2D image. The controller 130 may dispose the 2D anchor box of the predefined size and type in every pixel of the 2D image. The controller 130 may generate the 3D anchor box by averaging 3D information of objects fitted to each 2D anchor box.

The controller 130 may train the object extraction model using the 2D information and the 3D information (S120). The controller 130 may allow the object extraction model to learn the difference between the generated 2D anchor box and 3D anchor box and the verification anchor box. The object extraction model may learn the difference between the sizes of the generated 2D anchor box and 3D anchor box and the object information.

The controller 130 may determine whether the confidence is less than the threshold (S130). The threshold may be determined in advance by the system designer. When the confidence is less than the threshold, the controller 130 may perform the image projection using the 3D information. In other words, the processor 131 may project the corner points of the 3D anchor box onto the 2D image. In the present connection, the processor 131 may use the [Equation 1] to convert the 3D point into the 2D point.

The controller 130 may select the two pairs of points in the order of the distance between the 2D information and the 3D information from the shortest to the longest (S140). The controller 130 may determine the distances between the 4 corner points of the 2D anchor box and the 8 corner points of the 3D anchor box. The processor 131 may select the two pairs of corner points including the shortest distance among the determined distances.

The controller 130 may determine a 3D position of the object using the selected two pairs of points (S150). The controller 130 may determine the 3D center coordinates (x, y, z) of the 3D anchor box using the selected two pairs of points.

The controller 130 may perform the post-processing on the 3D information extracted from the 2D image (S160). The controller 130 may select the 3D anchor boxes of the objects extracted from the 2D image based on the predetermined anchor box selection criterion (condition). In the present connection, the controller 130 may select the anchor box using the argmax. The controller 130 may delete (remove) the corresponding 3D anchor box when a result of scaling the possibility of being the background of the 3D anchor box with the predetermined ratio exceeds the possibility of being the object of the 3D anchor box, so that the anchor boxes may be selected. The controller 130 may output the final 3D object information by sequentially performing the decode, the softmax, the sort, the NMS, and the like on the selected 3D information, that is, the 3D anchor box.

Figure 5:
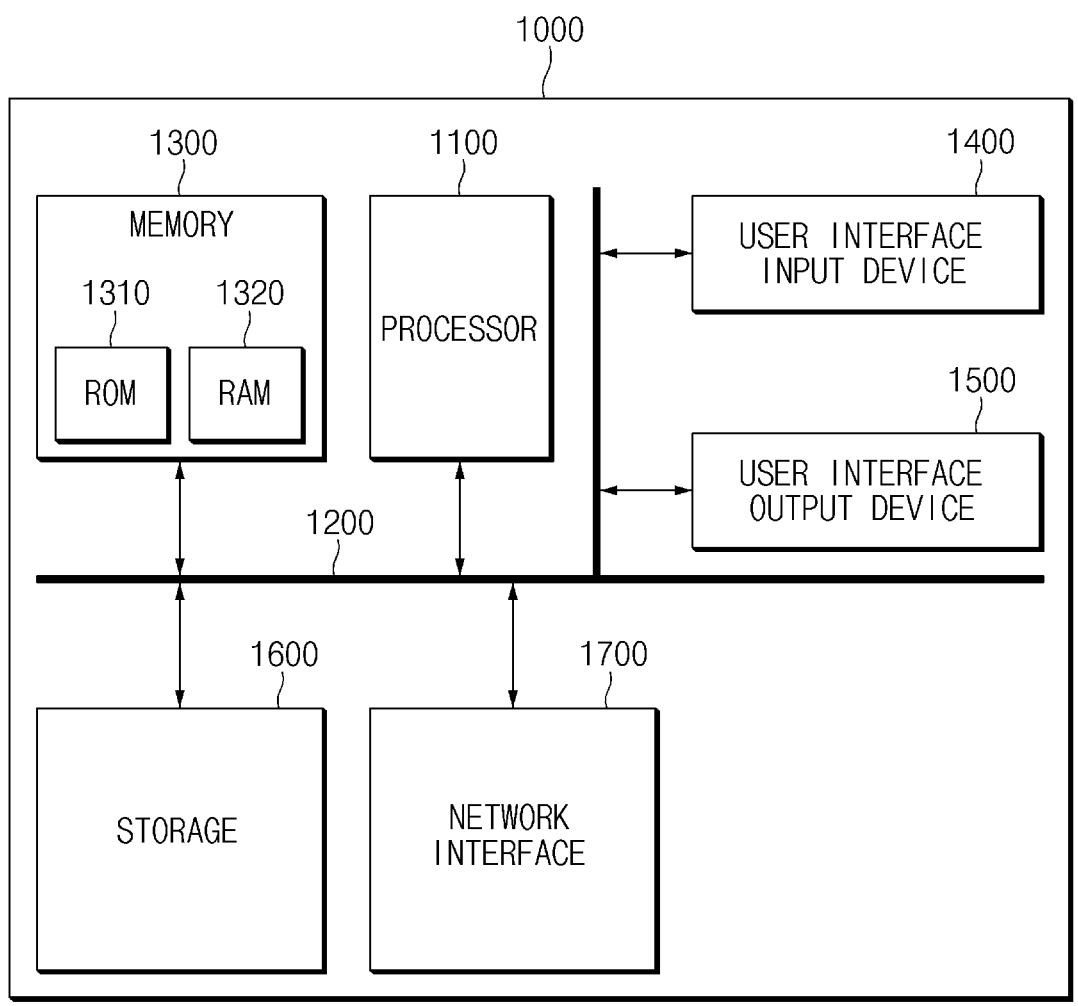
FIG. 5 is a block diagram illustrating a determining system executing a three-dimensional object detection method according to various exemplary embodiments of the present disclosure.

FIG. 5 is a block diagram illustrating a determining system executing a three-dimensional object detection method according to various exemplary embodiments of the present disclosure.

Referring to FIG. 5, a determining system 1000 may include at least one processor 1100, a memory 1300, a user interface input device 1400, a user interface output device 1500, storage 1600, and a network interface 1700 connected via a bus 1200.

The processor 1100 may be a central processing unit (CPU) or a semiconductor device that performs processing on commands stored in the memory 1300 and/or the storage 1600. The memory 1300 and the storage 1600 may include various types of volatile or non-volatile storage media. For example, the memory 1300 may include a Read-Only Memory (ROM) 1310 and a Random Access Memory (RAM) 1320.

Thus, the operations of the method or the algorithm described in connection with the exemplary embodiments included herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM. The exemplary storage medium is coupled to the processor 1100, which may read information from, and write information to, the storage medium. In another method, the storage medium may be integral with the processor 1100. The processor 1100 and the storage medium may reside within an application specific integrated circuit (ASIC). The ASIC may reside within the user terminal. In another method, the processor 1100 and the storage medium may reside as individual components in the user terminal.

The description above is merely illustrative of the technical idea of the present disclosure, and various modifications and changes may be made by those skilled in the art without departing from the essential characteristics of the present disclosure. Therefore, the exemplary embodiments disclosed in the present disclosure are not intended to limit the technical idea of the present disclosure but to illustrate the present disclosure, and the scope of the technical idea of the present disclosure is not limited by the embodiments. The scope of the present disclosure should be construed as being covered by the scope of the appended claims, and all technical ideas falling within the scope of the claims should be construed as being included in the scope of the present disclosure.

According to an exemplary embodiment of the present disclosure, as the two-dimensional information extracted from the two-dimensional image is utilized, an object three-dimensional information detection performance may be improved.

Furthermore, according to an exemplary embodiment of the present disclosure, as the point matching of the two-dimensional anchor box and the three-dimensional anchor box is performed based on the three-dimensional anchor box, the rigid body shape may be preserved and the reliable point matching is possible.

Furthermore, according to an exemplary embodiment of the present disclosure, as the anchor box of the object detected from the two-dimensional image is selected using the argmax without the softmax operation to perform the subsequent operation process, the operation speed may be improved.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An apparatus for detecting a three-dimensional object, the apparatus comprising:
   a camera configured for obtaining a 2D image; and
   a controller electrically connected to the camera,
   wherein the controller is configured to:
     extract 2D information and 3D information for at least one object from the 2D image; and
     detect 3D object information by utilizing the 2D information and the 3D information,
   wherein the 2D information includes 2D center coordinates, a width, and a height of a 2D anchor box,
   wherein the 3D information includes 3D center coordinates, a width, a height, a length, and a yaw of a 3D anchor box, and wherein the controller is further configured to:
  generate the 2D anchor box on the 2D image;
  generate the 3D anchor box by averaging 3D information of objects fitted to the 2D anchor box;
  learn a difference between the 2D anchor box, the 3D anchor box, and object information;
  select the 3D information using argmax; and
  output the 3D object information by sequentially performing decode, softmax, sort, and non-maximum suppression (NMS) on the selected 3D information.

2. The apparatus of claim 1, wherein the controller is configured to match the 2D information with the 3D information on the 2D image and to determine 3D position information of an object matching the 3D information based on a result of the matching.

3. The apparatus of claim 2, wherein the controller is configured to:
  determine distances between corner points of the 2D anchor box and corner points of the 3D anchor box; and
  select two pairs of corner points with a shortest determined distance among the determined distances.

4. The apparatus of claim 3, wherein the controller is configured to determine the 3D center coordinates of the 3D anchor box using the selected two pairs of corner points.

5. The apparatus of claim 1, wherein the controller is configured to remove a corresponding 3D information when a result of scaling a possibility that the 3D information is a background with a predetermined ratio exceeds a possibility that the 3D information is an object.

6. The apparatus of claim 1, wherein the camera is a monocular camera.

7. A method for detecting a three-dimensional object, the method comprising:
  obtaining, by a controller, a 2D image using a camera;
  extracting, by the controller, 2D information and 3D information for at least one object from the 2D image; and
  detecting, by the controller, 3D object information by utilizing the 2D information and the 3D information,
  wherein the 2D information includes 2D center coordinates, a width, and a height of a 2D anchor box,
  wherein the 3D information includes 3D center coordinates, a width, a height, a length, and a yaw of a 3D anchor box,
  wherein the extracting of the 2D information and the 3D information includes:
    creating, by the controller, the 2D anchor box on the 2D image;
    creating, by the controller, the 3D anchor box by averaging 3D information of objects fitted to the 2D anchor box;
    learning, by the controller, a difference between the 2D anchor box, the 3D anchor box, and object information, and
  wherein the detecting of the 3D object information includes:
    selecting, by the controller, the 3D information using argmax; and
    outputting, by the controller, the 3D object information by sequentially performing decode, softmax, sort, and non-maximum suppression (NMS) on the selected 3D information.

8. The method of claim 7, wherein the detecting of the 3D object information includes:
  matching, by the controller, the 2D information with the 3D information on the 2D image; and
  determining, by the controller, 3D position information of an object matching the 3D information based on a result of the matching.

9. The method of claim 8, wherein the matching of the 2D information with the 3D information includes:
  determining, by the controller, distances between corner points of the 2D anchor box and corner points of the 3D anchor box; and
  selecting, by the controller, two pairs of corner points with a shortest determined distance among the determined distances.

10. The method of claim 9, wherein the determining of the 3D position information of the object includes:
  determining, by the controller, the 3D center coordinates of the 3D anchor box using the selected two pairs of corner points.

11. The method of claim 7, wherein the selecting of the 3D information includes:
  removing, by the controller, a corresponding 3D information when a result of scaling a possibility that the 3D information is a background with a predetermined ratio exceeds a possibility that the 3D information is an object.

* * * * *